United States Patent
Sirivara et al.

(10) Patent No.: US 6,961,467 B2
(45) Date of Patent: Nov. 1, 2005

(54) IDENTIFYING IMAGE CONTENT

(75) Inventors: Sudheer Sirivara, Hillsboro, OR (US); Jeffrey S. McVeigh, Portland, OR (US); Robert J. Reese, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 693 days.

(21) Appl. No.: 09/982,728

(22) Filed: Oct. 17, 2001

(65) Prior Publication Data

US 2003/0072491 A1 Apr. 17, 2003

(51) Int. Cl.⁷ .............................. G06K 9/46; G06F 7/04; G06F 17/60; G06F 17/30
(52) U.S. Cl. ...................... 382/195; 382/199; 382/305; 340/5.74; 705/26; 707/6; 707/10; 709/217; 725/25
(58) Field of Search ............................... 382/190, 195, 382/199, 217, 218, 305; 725/5, 25, 28; 707/9, 10, 6; 380/232; 713/167, 193; 705/51, 52, 57, 400, 26; 709/217; 340/5.2, 5.21, 5.74

(56) References Cited

U.S. PATENT DOCUMENTS

| | | | |
|---|---|---|---|
| 4,230,990 A | * | 10/1980 | Lert et al. ..................... 725/22 |
| 5,504,518 A | * | 4/1996 | Ellis et al. ..................... 725/22 |
| 5,870,754 A | * | 2/1999 | Dimitrova et al. ........ 707/104.1 |
| 6,035,055 A | * | 3/2000 | Wang et al. ................. 382/118 |
| 6,385,596 B1 | * | 5/2002 | Wiser et al. ................... 705/51 |
| 6,584,221 B1 | * | 6/2003 | Moghaddam et al. ....... 382/165 |
| 6,751,363 B1 | * | 6/2004 | Natsev et al. ............... 382/305 |
| 2002/0023020 A1 | * | 2/2002 | Kenyon et al. ............... 705/26 |
| 2002/0059580 A1 | * | 5/2002 | Kalker et al. ................. 725/25 |
| 2002/0087538 A1 | * | 7/2002 | Abdel-Mottaleb et al. ..... 707/6 |
| 2002/0087885 A1 | * | 7/2002 | Peled et al. ................. 713/201 |
| 2002/0129140 A1 | * | 9/2002 | Peled et al. ................. 709/224 |
| 2002/0156743 A1 | * | 10/2002 | DeTreville .................... 705/57 |

OTHER PUBLICATIONS

Buttyan et al. "A Payment Scheme for Broadcast Multimedia Streams." Proc. 6th IEEE Symp. on Computers and Communications, Jul. 3, 2001, pp. 668–673.*

* cited by examiner

*Primary Examiner*—Jon Chang
(74) *Attorney, Agent, or Firm*—Steven D. Yates

(57) ABSTRACT

Identifying content and authorizing sharing thereof based at least in part on extracting feature data from content to be shared and comparing this extracted feature data against a database of extracted feature data for various reference content. When the content to be shared is matched to reference content in the database, sharing may be simply rejected, or rights associated with the reference content may be inspected to facilitate determining authorization.

30 Claims, 5 Drawing Sheets

IDENTIFYING IMAGE CONTENT

FIELD OF THE INVENTION

The invention generally relates to identifying image content, and more particularly to using perceptual features of image data, e.g., an image or movie, for identifying the image data and illicit distribution thereof.

BACKGROUND

Widespread availability of fast network connections has resulted in proliferation of software allowing users to share large data files encoding content, such as audio encodings (e.g., MP3 files), video encodings (e.g., Moving Picture Experts Group (MPEG), Microsoft Co.'s Video for Windows, Intel Co.'s Indeo, Apple Co.'s QuickTime, etc.), and other content and data files.

Well-known content sharing application programs include the Napster program created by Shawn Fannin, as well as Macster (Napster for Macintosh computers), Gnapster, and others. Older and more traditional file-sharing application programs, include the File Transfer Protocol (FTP), Unix-to-Unix Copy (UUCP), University of Minnesota's Gopher, etc. (Please note that all marks used herein are the property of their respective owners.)

Unfortunately, ease of content sharing has resulted in significant amounts of intentional and unintentional violation of intellectual property rights for shared content. This has resulted in many legal actions to shut down and ban use of content sharing application programs. Unfortunately, such actions also impede legitimate sharing.

BRIEF DESCRIPTION OF THE DRAWINGS

The features and advantages of the present invention will become apparent from the following detailed description of the present invention in which.

DETAILED DESCRIPTION

Figure 1:
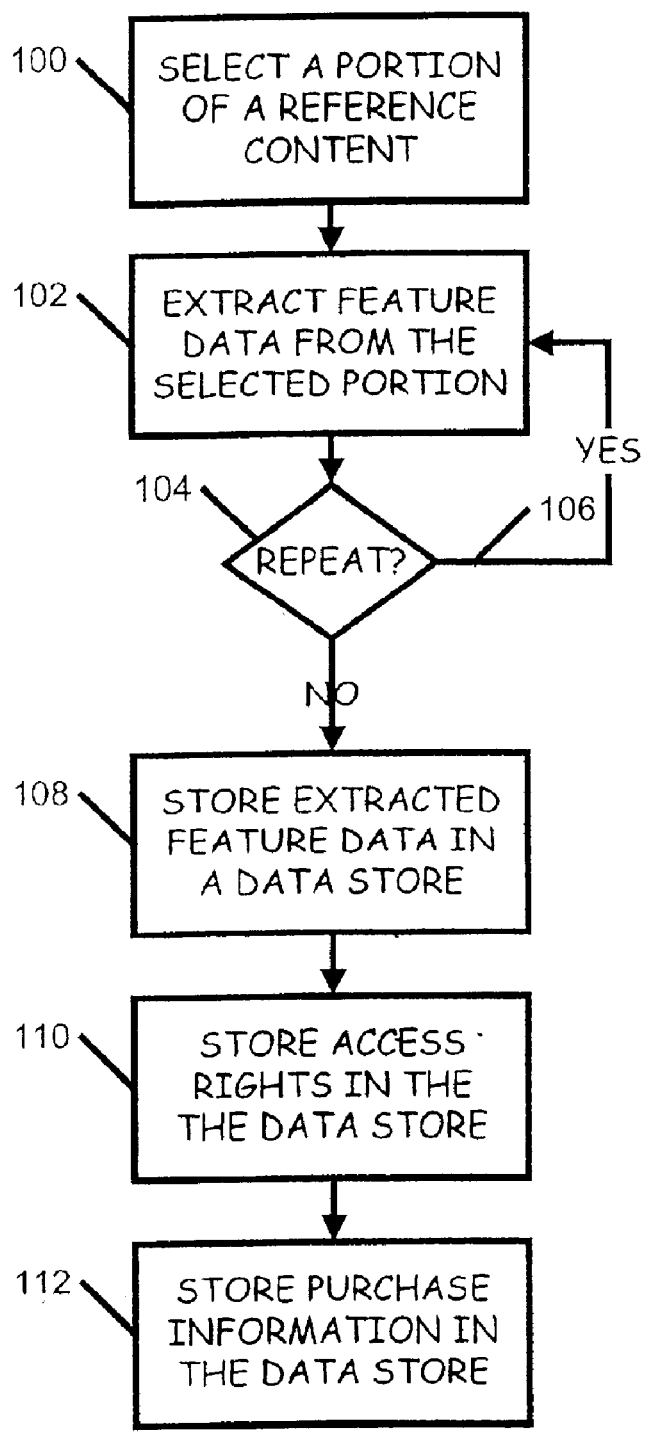
FIG. 1 illustrates a flow chart according to one embodiment for facilitating content sharing of protected content in accord with access rights for the protected content.

FIG. 1 illustrates a flow chart according to one embodiment for facilitating content sharing of protected content in accord with access rights for the protected content, while allowing unprotected content to be shared freely.

The illustrated embodiment generally concerns extracting identification features from content to be protected, and storing the extracted identification features along with access rights within a data store, such as a database. This allows the data store to be consulted, prior to performing content sharing, to validate or authorize the sharing before it occurs. Accordingly, for some reference content, such as a video recording, an image (picture) file, an audio recording, or other data, a portion of the reference content is selected 100 for analysis. In one embodiment, the selected portion is the entire reference content. In another embodiment, the selected portion comprises a sub-portion of the entire reference content. For expository convenience, it is assumed herein that the reference content is a video encoding, and that all frames of the reference content have been selected.

Feature data is extracted 102 from the reference content. For expository convenience, since the reference video content is broken into frames from which the feature data is extracted, the term "frame" is also used with respect to extracted feature data. As used herein, a particular frame of feature data corresponds to the frame of video content from which the feature data was extracted. In one embodiment, feature extraction comprises performing edge detection within each frame of the selected portion. In another embodiment, spatial and temporal features are identified and extracted from each frame. In one embodiment, the Sarnoff Just Noticeable Difference (JND) metric is used.

Other embodiments may use other feature extraction techniques may be used. See, for example, J. Lubin, M. Brill, R. Crane: *Vision Model-Based Assessment Of Distortion Magnitudes In Digital Video,* located on the Internet at Uniform Resource Locator (URL) http://www-mpeg-org/MPEG/JND (note, to prevent inadvertent hyperlinks, periods within the preceding URL were replaced with hyphens); American National Standards Institute (ANSI) standard T1.801.03-1996: *Digital Transport of One-Way Video Signals—Parameters for Objective Performance Assessment;* and MPEG standards regarding object recognition and extraction.

For example, in one embodiment, a portion of each frame, such as a rectangle of pixels selected from the center of each frame, is sampled from a video at a sampling rate of four frames per second (FPS) irrespective of a source frame rate, with six frames being sampled. The sample region is subdivided into blocks, e.g., 8×8, 8×16, 16×16, 64×64, etc. may be used; it will be appreciated that different block sizes may be used depending on the content. Edge detection is performed in each of the six sampled frames, and scalar values for each block determined based on the edge detection that reflect spatial activity and angular distribution of spatial activity. In one embodiment, scalar values for multiple frames are combined to form a signature value identifying the sampled content; such signatures may be compared (see FIG. 4) to match unknown content against known content.

After extracting 102 feature data from the selected 100 portion, a test 104 is performed to determine whether the last frame of the reference content has been reached and extraction is complete. If not, extraction 102 continues 106. When extraction is complete, the extracted feature data is stored 108 in a data store, such as a database or other storage media or storage technology. It will be appreciated by one skilled in the art that instead of storing the extracted feature data, the extracted feature data may be used to generate an identifier for the reference content, e.g., by inputting the extracted feature data to a hash function, Globally Unique Identifier generator, etc.

The amount of data extracted from reference content may be arbitrarily small depending on computation requirements or processing environment or resource limitations. For example, assuming video frames are being processed, feature data extraction may be based on very small portions of each frame. The size and number of arrays from which features are extracted may be arbitrarily limited to reduce the amount of data storage required to identify a particular reference content. In one embodiment, at most 1% of reference content is extracted and stored 108. Similarly, temporal sampling may be based upon a different subset of the frames to reduce computation requirements and extracted data size.

After storing 108 the extracted 102 feature data for the reference content, in one embodiment, access rights are stored 110 in the data store. For example, stored access rights may be provided to a sharing application program, e.g., a program used by a user seeking to share a candidate content, so that the sharing application program may provide sharing options to the user. Access rights may be used to restrict or grant sharing rights based on various criteria, including demographic profile data or other characteristics of the user. It will be appreciated that access rights may be stored and/or determined separately from the storing of extracted feature data.

After storing 110 access rights, in one embodiment, purchase information for the reference content is stored 112 in the data store. For example, assuming it has been determined that a user of a sharing application program is attempting to illicitly share a candidate content in violation of the candidate content's access rights, then purchase information may be provided to an intended recipient of the candidate content and/or the sharing application program. It will be appreciated that purchase information may be stored and/or determined separately from the storing of extracted feature data.

Figure 2:
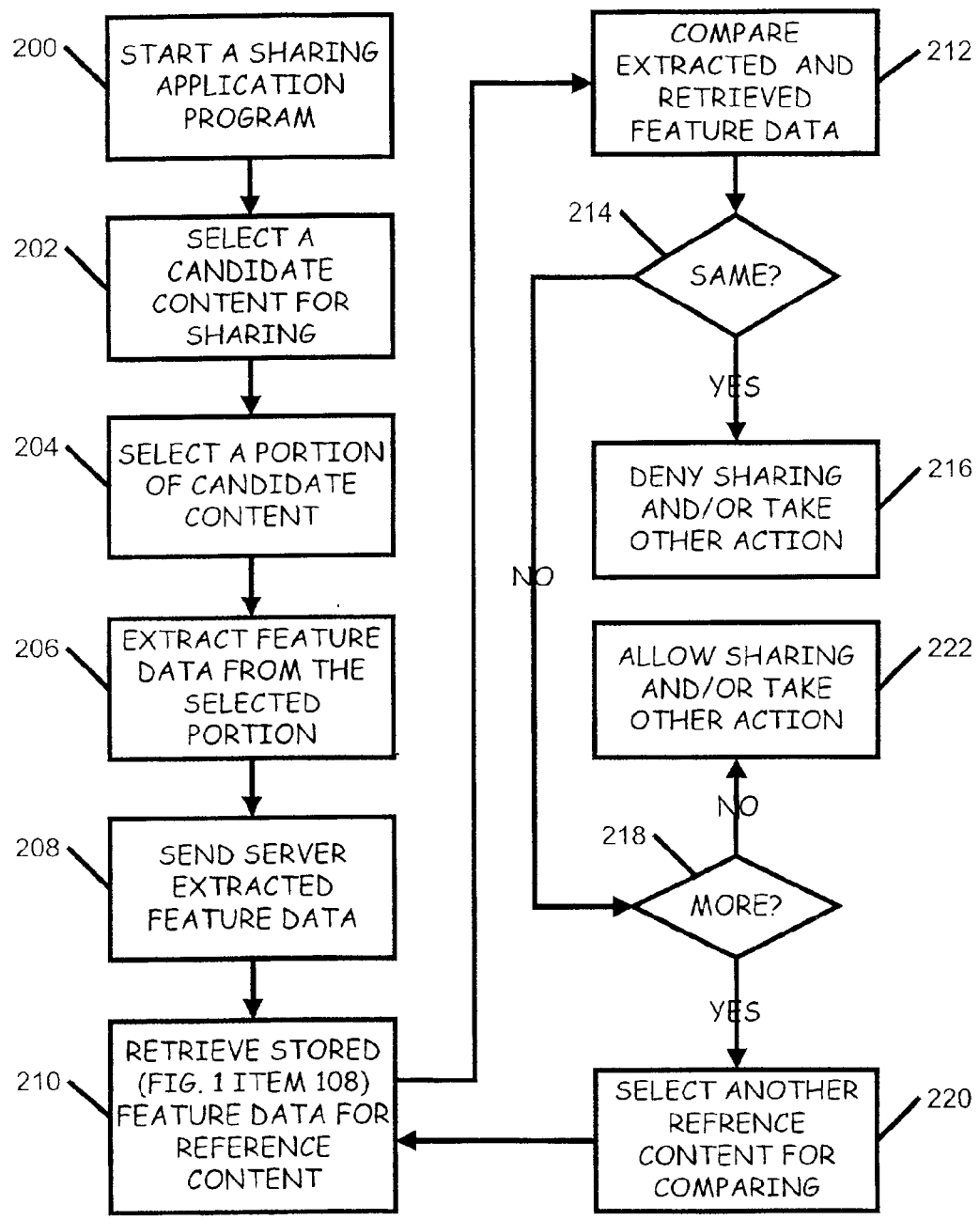
FIG. 2 illustrates, according to one embodiment, a flow chart of a user seeking to share candidate content with a recipient for the content.

FIG. 2 illustrates, according to one embodiment, a flow chart of a user seeking to share candidate content with a recipient for the content, e.g., another user.

As illustrated, the user starts 200 a sharing application program. It will be appreciated that many different network application programs may be used to share data, including Napster, GNapster, Gnutella (a Napster-like application for sharing audiovisual content), and Internet browsers, such as Internet Explorer by Microsoft Corporation, Netscape Navigator by America Online, Inc., or another network communication application program. It is assumed the sharing application program has an appropriate plug-in or built-in capability for performing the invention.

The user selects 202 a candidate content for sharing, and a portion of the candidate content is selected 204 from which feature data is extracted 206 as discussed above in FIG. 1. For the purposes of this discussion, it is assumed the selected candidate content is a video encoding, and that selecting 204 comprises selecting regions of multiple video frames from which to extract 206 feature data as discussed above for FIG. 1. However, it will be appreciated that the invention may be practiced with other data formats. Once the feature data is extracted, the next step is to attempt to identify the candidate content which the user is attempting to share.

It will be appreciated that, depending on the nature of the candidate content, feature extraction may require decoding the candidate content. For example, for an MPEG video encoding, in order to extract feature data from the first frame of the selected portion, it may be necessary to decode the MPEG stream up to the first frame. Such decoding requirements, when necessary, are implied in the present description and will not be called out explicitly.

Assume a server or other machine is communicatively coupled to a data store storing extracted feature data for different content. In one embodiment, the client sends 208 the server, e.g., by way of a plug-in, built-in or other communication means, the feature data extracted from the candidate content. The server retrieves 210 stored (see FIG. 1 item 108) feature data for a reference content, and compares 212 the extracted 206 feature data with the stored 108 feature data to see if there is a match. In one embodiment, to foil attempts to circumvent sharing protection, the server performs a sliding window comparison against the extracted feature data for the candidate content (see FIG. 3).

A test 214 is performed to determine whether the candidate content matched the current reference content. If so, then in one embodiment, sharing is denied 216, and the sharing application program instructs the user of the program regarding any options, if any. For example, as discussed in FIG. 1, there may be associated data for a reference content that provides options to the user of the sharing application program or to the intended recipient of the candidate content, e.g., purchase information may be provided to the intended recipient and/or the user. It will be appreciated that any arbitrary action may be taken in response to determining a match.

If the candidate content did not match the reference content, then a test 218 is performed to determine whether there are other known reference content having feature data stored in the data store. If so, then another reference content is selected 220 for comparing against the candidate content, and processing continues with retrieving 210 the stored feature data for the newly selected reference content. If there were no more reference content feature data in the data store, then the candidate content is not known to be protected, and the sharing is allowed 222 to proceed. For example, the user's sharing application program can be instructed by the server to proceed with a data transfer of the candidate content.

In one embodiment, not illustrated, extracted 206 feature data for the candidate content is saved to allow later identification and/or validation of a previous transfer based on new values entered into the data store.

Figure 3:
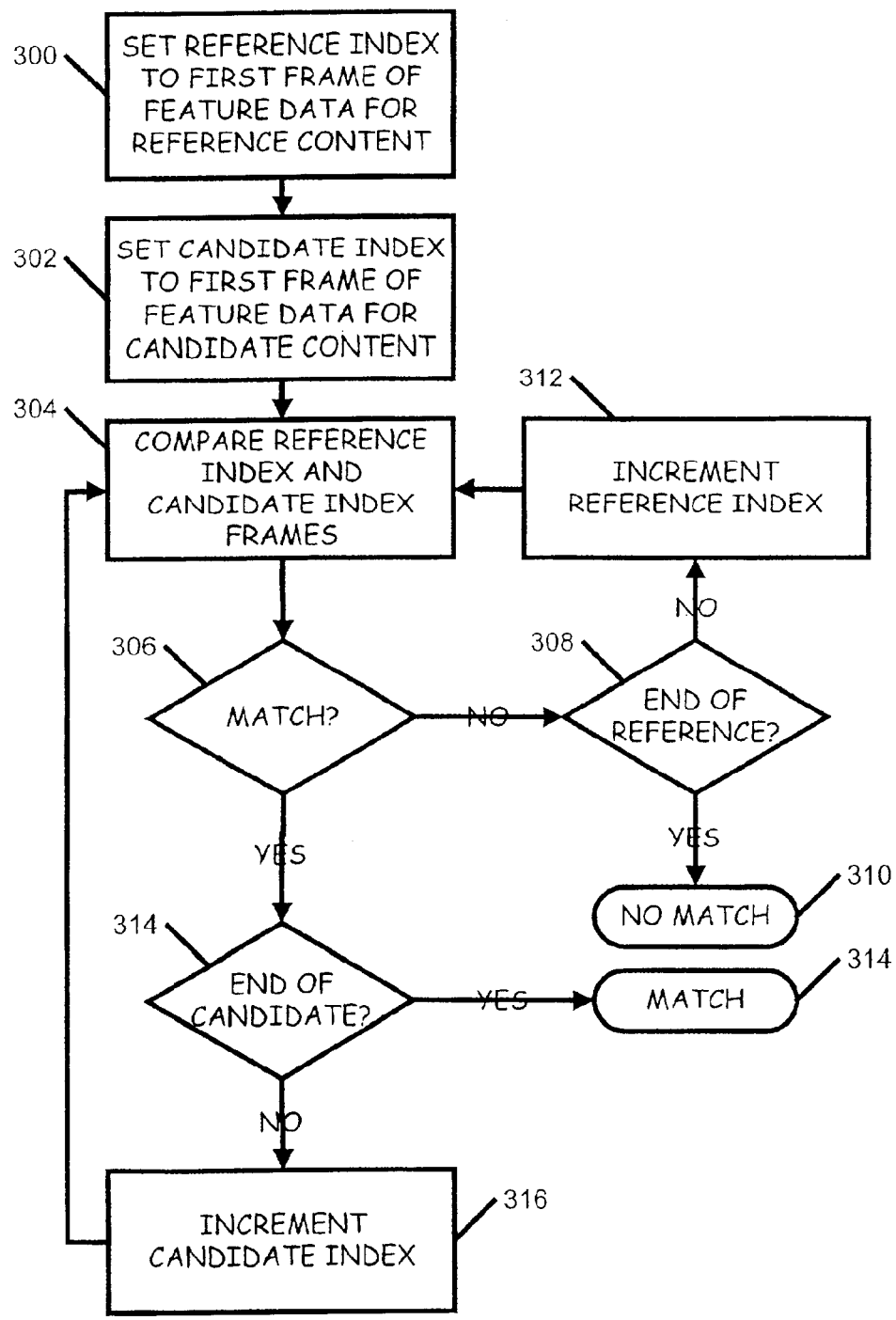
FIG. 3 illustrates one embodiment for implementing the FIG. 2 comparison between extracted feature data for a candidate content and a reference content.

FIG. 3 illustrates one embodiment for implementing the FIG. 2 comparison 212 between extracted feature data for a candidate content and a reference content. In the illustrated embodiment, video frames from both the reference content and candidate content have been analyzed and feature data extracted. It is assumed that all of the reference content frames have been analyzed and extracted feature data stored in a data store, while only a subset of the candidate content frames have been analyzed.

A sliding-window comparison is performed to identify the appropriate starting frame, if any, within the reference content that corresponds to the first frame of candidate content that was analyzed and feature data extracted. Performing a sliding window comparison increases security, in that the starting point for analysis of the candidate content can be arbitrarily selected. In the illustrated embodiment, indexes (or pointers) are used to identify a particular frame of the reference content or candidate content for which feature data has been extracted. It will be appreciated that other techniques may be used to traverse and compare feature data.

In one embodiment, therefore, a reference index is set 300 to a first frame of the extracted feature data for the reference content, and a candidate index is set 302 to a first frame of the extracted feature data for the candidate content. The feature data indexed by the reference index and candidate index are compared 304. A test 306 is performed to determine whether the comparison indicates they match. The term "match," as used herein, includes exact matches between extracted reference and candidate feature data, as well as matches within a desired tolerance threshold. For example, one may try to trick an authentication system by degrading the candidate content before trying to share it. This may result in a degradation of extracted feature data for the candidate content. However, the match threshold may be set such that degraded feature data nonetheless matches the reference feature data. (See FIG. 4.)

If the test 306 does not indicate a match, another test 308 is performed to determine whether the reference index points to the last frame of the feature data for the reference content. If yes, then there has not been a match between the extracted feature data for the reference content and the candidate content, and processing ends 310. If the test 308 indicates more frames, then the reference index is incremented 312 to the next frame, thus moving the sliding-window for continuing comparison 304.

If the test 306 indicates a match between the extracted feature data, a test 314 is performed to determine whether the last frame of the candidate feature data has been reached. If yes, then there has been a match between the extracted feature data for the reference content and the candidate content, and processing ends 314. As discussed above, various responses may be taken on a successful match, including denying the sharing, providing purchase information for the sharing, or other action. If the test 314 indicates the last frame has not been reached, then the candidate index is incremented 316 to the next frame, thus continuing comparison 304 within the current position of the current sliding-window on the reference feature data.

Although the illustrated embodiment shows a single-threaded sliding-window comparison, it will be appreciated that the comparison may be parallelized for a multiprocessor computing device. For example, if there are N reference content entries in the database, then N processors could be assigned to compare candidate against all reference content in parallel.

Alternatively, assuming there are as many processors as there are frames in the reference content, and the extraction process employed allows matching a potential starting frame (there may be more than one apparent starting frame) against extracted candidate content feature data, then identifying the correct starting frame can be performed in a single operation.

Similarly, assuming sufficient processors, and the extraction process employed allows matching a potential starting frame against extracted candidate content feature data, a comparison between the candidate and reference content feature data can be performed in a single operation, plus a test to see if any comparisons were positive. For example. If the reference content is M frames, and the extracted candidate content is N frames, then N processors can be assigned to the first M–N reference frames, where (M–N)×N comparisons are performed simultaneously. A test may be performed to see if any of the comparisons indicated a match. Of course, other parallel testing configurations may be performed with fewer processors.

Figure 4:
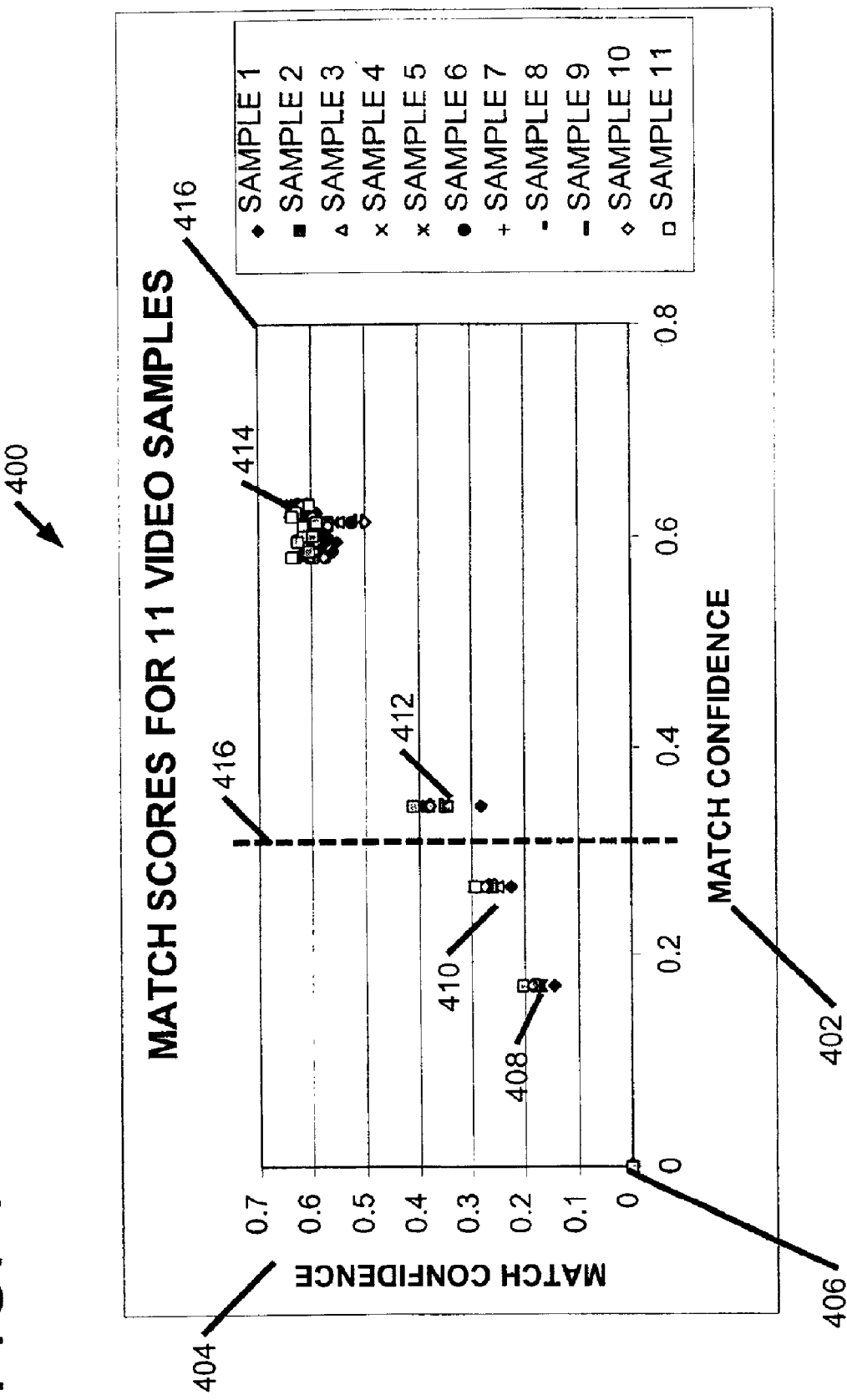
FIG. 4 illustrates a comparison between reference contents against themselves, degraded copies of the reference content, and entirely different content, where match confidence values are plotted on both the X and Y axes of the illustration.

FIG. 4 illustrates a comparison between 11 reference contents against themselves, 3 degraded copies of the reference content, and 10 entirely different content, where match confidence values are plotted on both the X and Y axes of the chart 400. Illustrated is a scatter plot of match scores ranging between 0 and 1 plotted against themselves. Thus both the X-axis 402 and Y-axis 402 of the chart illustrate match confidence values for the degree to which extracted feature data for particular candidate content matches extracted feature data for the reference content. A score at the origin (0,0) 406 is a perfect match, representing comparing content against itself. Scores moving away from the origin represent matches having less match confidence. A score at (1,1) 416 indicates a total mismatch.

In the illustrated embodiment, reference content was intentionally degraded by using lossy video compression at different quality levels; using a high level of compression resulted in the greatest degradation. Video compression is typically used for storing and sharing video, and therefore is appropriate for identifying attempts to engage in illicit sharing of reference content. It will be appreciated, however, that many other alterations may be made to distort the reference content, and these different alteration techniques may be accounted for when matching reference and candidate content. For example, one may re-encode the reference content with a poor encoding engine. In this latter example, since candidate content needs to be decoded in order to extract feature data, a poor encoding technique results in degraded output, display window reduced size, poorer audio quality.

The chart clusters 408–412 illustrate three comparisons between the 11 reference content videos and three different degradations of each of reference content. As illustrated, comparisons for all eleven candidate content cluster 408–412 for each degradation used. In one embodiment comparisons are based on scalar values determined for portions of a video as discussed above with respect to FIG. 1.

To confirm the efficacy of comparing extracted feature data from reference content with extracted feature data from degraded versions of the reference content, the fourth chart cluster 414 represents comparing reference content against different content not derived from the reference content. As illustrated, the fourth cluster matches have high comparison scores, which is a very low match confidence, and suggests a mismatch between the compared content. Such high scores may result when the content has been severely degraded, such as from extreme compression, or when the content is compared against different content. Based on the chart results, one may decide to set a threshold 416, such as at 0.3 or other desired level, to represent a content quality so poor, that even if candidate content was actually derived from reference content, as opposed to coincidentally somewhat correlating, a sharing transaction may nonetheless be authorized to take place.

Figure 5:
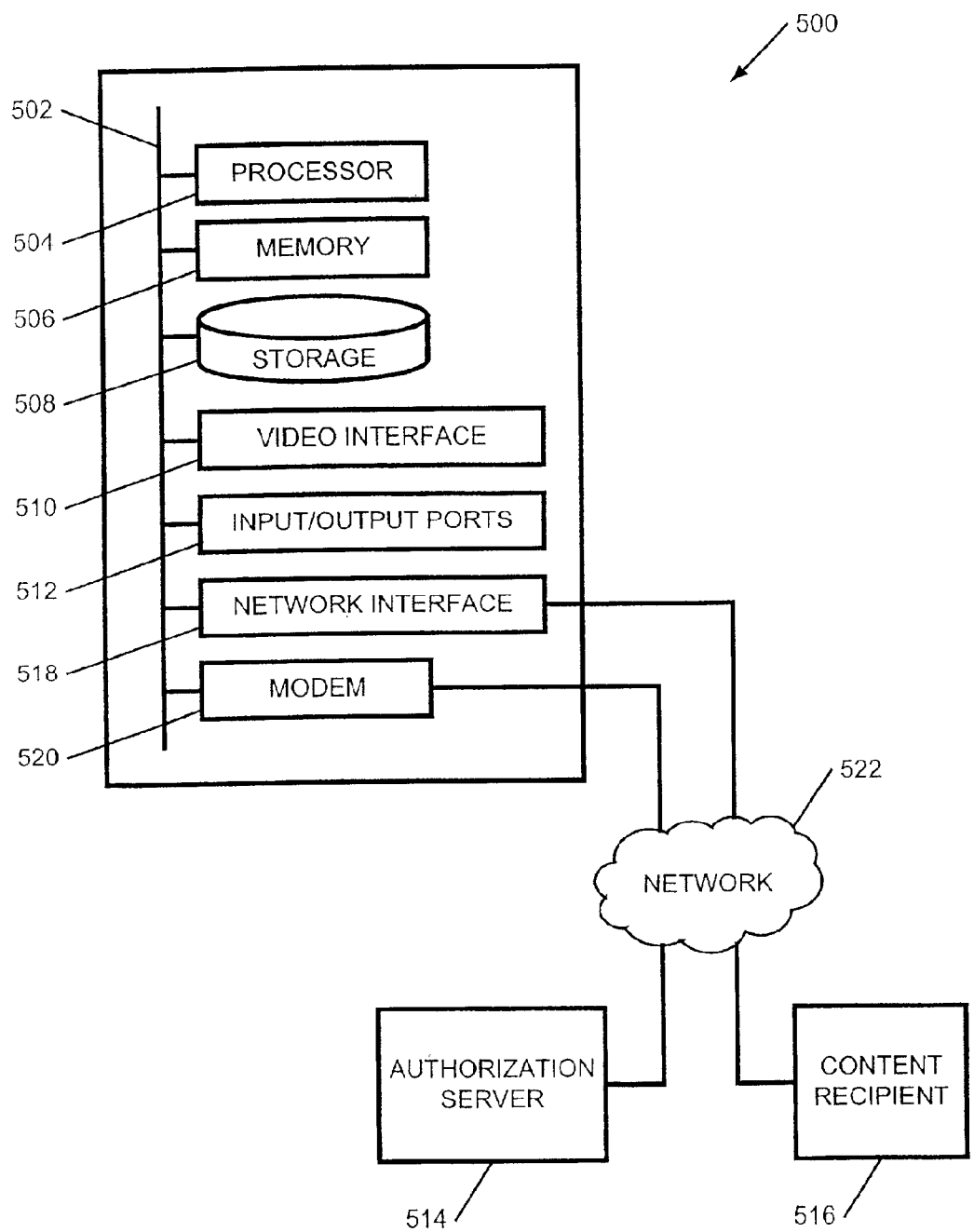
FIG. 5 illustrates a suitable computing environment in which certain aspects of the invention may be implemented.

FIG. 5 and the following discussion are intended to provide a brief, general description of a suitable computing environment in which certain aspects of the illustrated invention may be implemented. An exemplary system includes a machine or system 500 having system bus 502. Typically, attached to the bus are processors 504, a memory 506 (e.g., RAM, ROM), storage devices 508, a video interface 510, and input/output interface ports 512.

The system may also include embedded controllers, such as Generic or Programmable Logic Devices or Arrays, Application Specific Integrated Circuits, single-chip computers, smart cards, or the like, and the system is expected to operate in a networked environment using physical and/or logical connections to one or more remote machines or systems 514, 516, through a network interface 518, modem 520, or other data pathway. Systems may be interconnected by way of a wired or wireless network 522, such as the an intranet, the Internet, local area networks, wide area networks, cellular, cable, laser, satellite, microwave, "BlueTooth" type networks, optical, infrared, or other short range or long range wired or wireless carrier.

The invention may be described by reference to or in conjunction with program modules, including functions, procedures, data structures, application programs, etc. for performing tasks, or defining abstract data types or low-level hardware contexts. Program modules may be stored in memory 506 and/or storage devices 508 and associated storage media, e.g., hard-drives, floppy-disks, optical storage, magnetic cassettes, tapes, flash memory cards, memory sticks, digital video disks, biological storage. Program modules may be delivered over transmission environments, including network 522, in the form of packets, serial data, parallel data, propagated signals, etc. Program modules may be used in a compressed or encrypted format, and may be used in a distributed environment and stored in local and/or remote memory, for access by single and multi-processor machines, portable computers, hand-held devices, e.g., Personal Digital Assistants (PDAs), cellular telephones, or the like.

Thus, for example, with respect to the illustrated embodiments, assuming machine 500 operates, for example, as a computer used to share content, such as audio content, video content, etc. over a network with remote recipients, then remote machines or systems 514, 516 may respectively be an authentication server 514 for authenticating attempted sharing of content, and an intended recipient 516 of the content to be shared. It will be appreciated that remote machines or systems 514, 516 may be configured like machine 500, and therefore include many or all of the elements discussed for machine. It should also be appreciated that machines or systems 500, 514, 516 may be embodied within a single device, or separate communicatively-coupled components.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method for authorizing transfer of a candidate content against a data store storing extracted feature data for reference content, comprising:
   extracting first feature data from the candidate content, wherein said extracting comprises apportioning the candidate content into plural sub-regions and extracting feature data from the plural sub-regions, and wherein each sub-region is at most ten percent of the candidate content; and
   sending extracted feature data to a sever configured to perform
   selecting reference feature data from the data store,
   comparing extracted feature data with the reference feature data, and
   determining an authorization for transfer of the candidate content based at least in part on the comparing.

2. The method of claim 1, wherein the reference content comprises an image.

3. The method of claim 1, wherein the reference content comprises a video.

4. The method of claim 1, wherein the first feature data is extracted from a central portion of the candidate content.

5. The method of claim 1, wherein the sub-regions have at least one dimensional extent less than or equal to 64 pixels.

6. The method of claim 1, wherein extracting first feature data comprises:
   performing edge detection on the plural sub-regions.

7. The method of claim 1, further comprising:
   determining first sub-regions for a first frame of the candidate content;
   determining second sub-regions for a second frame of the candidate content;
   extracting the first feature data from the first sub-regions; and
   extracting a second feature data from the second sub-regions.

8. The method of claim 1, wherein extracting the first feature data comprises selected ones of: performing edge detection, and detecting motion of an object of the first frame to the second frame.

9. The method of claim 1, further comprising:
   performing the method with a network browser plug-in.

10. A method for authorizing transfer of a candidate content against a data storage storing extracted feature data for reference content, comprising:
    receiving feature data for the candidate content comprising extracted feature data for a portion of the candidate content and extracted feature data for a first portion of the reference content;
    selecting first reference feature data from the data storage, the first reference feature data comprises extracted feature data for a first portion of the reference content;
    first comparing the received feature data to the first reference feature data;
    authorizing transfer of the candidate content based at least in part on the first comparing;
    determining a non-match between the received feature data and the first reference feature data;
    selecting second reference feature data from the data storage comprising extracted feature data for a second portion of the reference content; and
    second comparing the second reference content to the received feature data; and
    performing a sliding window comparison to match the received feature data against the reference content;
    wherein the first reference feature data corresponds to a first location of the sliding window on the reference content, and the second reference feature data corresponds to a second location of the sliding window on the reference content.

11. The method of claim 10, wherein the first and the second portions of the reference content overlap.

12. The method of claim 10, wherein the first and second comparing correspond to a comparison of a sliding window on the reference content.

13. The method of claim 10, further comprising:
determining a degree of similarity between the candidate content and the reference content based at least in part on the first and second comparing.

14. A method for facilitating transfer authorization for a reference content comprising multiple frames, the method comprising, for each frame of the reference content, performing:
determining sub-regions for a current-frame of the reference content;
extracting feature data for the sub-regions;
storing the extracted feature data in a database; and
storing transfer authorization criteria in the database.

15. The method of claim 14, wherein extracting feature data comprises selected ones of: performing edge detection, and detecting motion of an object of the first frame to the second frame.

16. An article, comprising:
a machine-accessible media having associated directives for authorizing transfer of a candidate content against a data store storing extracted feature data for reference content, wherein the directives, when accessed, results in a machine performing:
extracting first feature data from the candidate content, the extracting including apportioning the candidate content into plural sub-regions and extracting feature data from the plural sub-regions, wherein each sub-region is at most ten percent of the candidate content;
sending extracted feature data to a sever configured to perform
selecting reference feature data from the data store,
comparing extracted feature data with the reference feature data, and
determining an authorization for transfer of the candidate content based at least in part on the comparing.

17. The article of claim 16, wherein the reference content comprises an image.

18. The article of claim 16, wherein the reference content comprises a video.

19. The article of claim 16, wherein the first feature data is extracted from a central portion of the candidate content.

20. The article of claim 16, wherein the sub-regions have at least one dimensional extent less than or equal to 64 pixels.

21. The article of claim 16, wherein the directives for extracting first feature data further includes directives, when accessed by the machine, results in the machine performing:
performing edge detection on the plural sub-regions.

22. The article of claim 16, wherein the directives further include directives, when accessed by the machine, results in the machine performing:
determining first sub-regions for a first frame of the candidate content;
determining second sub-regions for a second frame of the candidate content;
extracting the first feature data from the first sub-regions; and
extracting a second feature data from the second sub-regions.

23. The article of claim 16, wherein the directives for extracting the first feature data includes directives, when accessed by the machine, results in the machine performing selected ones of: edge detection, and detecting motion of an object of the first frame to the second frame.

24. The article of claim 16, wherein the directives further include directives, when accessed by the machine, results in the machine performing:
performing the method with a network browser plug-in.

25. An article comprising a machine-accessible media having associated directives for authorizing transfer of a candidate content against a data store storing extracted feature data for reference content, wherein the directives, when accessed, results in a machine performing:
receiving feature data for the candidate content comprising extracted feature data for a portion of the candidate content and extracted feature data for a first portion of the reference content;
selecting first reference feature data from the data storage,
first comparing the received feature data to the first reference feature data;
authorizing transfer of the candidate content based at least in part on the first comparing;
determining a non-match between the received feature data and the first reference feature data;
selecting second reference feature data from the data storage comprising extracted feature data for a second portion of the reference content;
second comparing the second reference content to the received feature data; and
performing a sliding window comparison to match the received feature data against the reference content;
wherein the first reference feature data corresponds to a first location of the sliding window on the reference content, and the second reference feature data corresponds to a second location of the sliding window on the reference content.

26. The article of claim 25, wherein the first and the second portions of the reference content overlap.

27. The article of claim 25, wherein the first and second comparing correspond to a comparison of a sliding window on the reference content.

28. The article of claim 25, wherein the directives further include directives, when accessed by the machine, results in the machine performing:
selecting second reference feature data from the data storage;
second comparing the received feature data with the second reference feature data; and
determining a degree of similarity between the candidate content and the reference content based at least in part on the first and second comparing.

29. An article, comprising:
a machine-accessible media having associated directives for facilitating transfer authorization for a reference content comprising multiple frames, wherein the directives, when accessed, results in a machine performing, for each frame of the reference content:
determining sub-regions for a current-frame of the reference content;
extracting feature data for the sub-regions;
storing the extracted feature data in a database; and
storing transfer authorization criteria in the database.

30. The article of claim 29, wherein the directives for extracting the first feature data includes directives, when accessed by the machine, results in the machine performing selected ones of: edge detection, and detecting motion of an object of the first frame to the second frame.

* * * * *